United States Patent [19]
Vestberg et al.

[11] Patent Number: 5,981,665
[45] Date of Patent: Nov. 9, 1999

[54] POLYOLEFINE-POLYACRYLATE BASED THERMOPLASTIC ELASTOMER

[75] Inventors: Torvald Vestberg, Porvoo; Viveca Lonnberg, Box; Tommi Vainio, Jyväskylä ; Kalle Hanhi, Nokia; Harri Jukarainen, Espoo, all of Finland

[73] Assignee: Optatech Corporation, Espoo, Finland

[21] Appl. No.: 08/849,993

[22] PCT Filed: Dec. 15, 1995

[86] PCT No.: PCT/FI95/00685

§ 371 Date: Aug. 20, 1997

§ 102(e) Date: Aug. 20, 1997

[87] PCT Pub. No.: WO96/20228

PCT Pub. Date: Jul. 4, 1996

[30] Foreign Application Priority Data

Dec. 23, 1994 [FI] Finland ..................................... 946055
Apr. 21, 1995 [FI] Finland ..................................... 951904

[51] Int. Cl.$^6$ ....................................................... C08F 25/02
[52] U.S. Cl. ........................... 525/243; 525/286; 525/293; 525/301; 525/302
[58] Field of Search ..................................... 525/243, 286, 525/293, 301, 302

[56] References Cited

FOREIGN PATENT DOCUMENTS

| | | |
|---|---|---|
| 0554058A1 | 8/1993 | European Pat. Off. . |
| 554058 | 7/1994 | European Pat. Off. . |
| 0632071A2 | 1/1995 | European Pat. Off. . |
| 95038 | 8/1995 | Finland . |
| 70 3090 | 1/1995 | Japan . |
| 9415981 | 7/1994 | WIPO . |
| WO 96/12745 | 5/1996 | WIPO . |

*Primary Examiner*—Melvyn I. Marquis
*Assistant Examiner*—D. Aylward
*Attorney, Agent, or Firm*—Birch, Stewart, Kolasch & Birch, LLP

[57] ABSTRACT

A thermoplastic elastomer is achieved by absorbing an acrylate monomer, an initiator and eventually a diacrylate into polyolefin particles, after which the temperature is raised and the acrylate polymerises into the polyolefin and forms a dispersed phase, which has been functionalized by copolymerising a functional monomer together with the acrylate. As a compatibiliser a grafter polyolefin is used, which is melt-blended after the polymerisation into the thermoplastic elastomer or before the polymerisation into the polyolefin.

17 Claims, No Drawings

POLYOLEFINE-POLYACRYLATE BASED THERMOPLASTIC ELASTOMER

The invention concerns a polyolefine based thermoplastic elastomer which can be prepared without a separate vulcanisation stage and which has been achieved by the polymerisation of acrylate into the polyolefine matrix. Especially the invention concerns such thermoplastic elastomers in which polyacrylate has been functionalised.

Thermoplastic elastomers are polymers which have the good processing properties of thermoplastics but have the same physical properties as vulcanised rubbers. This combination of properties can be obtained so that the material has both soft and elastic segments, with low glass transition temperature $t_g$, and a rigid eventually crystalline segment with a high glass transition temperature or a high melting point. The rigid and soft segments must be thermodynamically incompatible with each other, so that they form separate phases. Thermoplastic elastomers do not need any separate vulcanising stage, in the contrary to conventional rubber, and they can be processed to different articles with the processing methods normally used with thermoplastics, like extrusion, injection moulding and blow moulding. On the contrary to rubber, thermoplastic elastomers can also be reprocessed if necessary, for example when recycling material from the processing stage.

Thermoplastic elastomers can be divided into two main groups, block copolymers and thermoplastic/elastomer blends. A well=known example of block copolymers which are thermoplastic elastomers is the anionically polymerised block copolymer of styrene and butadiene (SBS) and the hydrogenised form of the same (SEBS). Drawbacks of these polymers are poor weather resistance, poor oil resistance and the high price.

An example of materials which belong to the other main group of thermoplastic elastomers, are blends of polypropylene and ethylene/propylene rubber or ethylene/propylene/diene rubber. They are usually made by blending the two main components and additives in an extruder. Because the continuous phase is polypropylene the material has good oil resistance properties.

Finnish patent application FI931863 describes a method to produce a thermoplastic elastomer having a polyolefine as a continuous phase and a polyacrylate as a dispersed phase. The acrylate is polymerised into the polyolefin. In the patent application FI946055 it has been noticed that even better properties can be achieved and tailored by using a blend of two or more polyolefins, from which one is polar.

It has now, surprisingly, been observed that by copolymerising to the acrylate phase suitable functional monomers and by adding to the polyolefine phase polyolefines grafted with functional groups, chemical bonds or strong secondary effects can be achieved between the phases. Then also the physical and thermal properties of the elastomers are remarkably improved.

In the functional polyolefines, the functional monomers can be unsaturated carboxylic acids, their anhydrides or other carboxylic acid derivatives, like carboxylic acid esters. Typical examples of such monomers are maleic acid anhydride, acrylic and methacrylic acid and glycidyl(meth) acrylate. The amount of the functional monomer is 0.1–10% by weight, preferably 0.5–2% by weight, based on the amount of polyolefine. The functional polyolefine can be added either to the polyolefine before the impregnation of acrylates or it can be blended with the elastomer after the polymerisation.

According to the invention, the polyacrylate phase can thus be functionalised by adding to the acrylate monomer one or more functional monomers. The functional monomers can be of the same type which are used in the grafting of polyolefine. Especially recommendable are α-unsaturated carboxylic acids, oxazolines and epoxy-, amino- and hydroxyfunctionalised (meth)acrylates, from which, as examples, can be mentioned glycidylmethacrylate, 2-tertbutylaminoethylmethacrylate, propyleneglycolmonomethacrylate and monomethacryoloxyethylphthalate. The amount of the functional monomer is 0.1–15% by weight, preferably 0.5–10% by weight, of the amount of the rubber phase.

Also according to the invention, the polyolefine can be some polyolefine as such or a blend of two or more polyolefines. If more than one polyolefine is used they are melt blended by using extrusion or other melt blending equipment.

The elastomeric material according to this invention can be made by some known method in which monomers are polymerised by free radical polymerisation technique into polyolefine matrix, e.g. by the Finnish patent 88170. In principal the production is made so that the acrylate monomer, the functional monomer and optionally diacrylate monomer, and the initiatior is first absorbed into polyolefine particles. When all monomers and the initiator have been absorbed, the temperature is elevated and the initiator decomposes and the acrylate and the functional monomer are polymerised. During the impregnation the polyolefine particles swall to some extend, but maintain their particle structure during both the impregnation and also the polymerisation.

The polyolefine matrix can thus be a homo- or copolymer of ethylene or propylene or a blend of two or more polyolefines.

A comonomer for ethylene polymer can be vinyl acetate, vinyl chloride, propylene or some other α-olefin, $C_1$-$C_2$-alkylacrylate and -methacrylate, acrylic acid or methacrylic acid, hydroxyalkylacrylate or =methacrylate, glycidylacrylate or -methacrylate, dienes such as hexadiene-1,4, hexadiene-1,5, heptadiene-1,6, 2-methylpentadiene-1,4, octadiene-1,7, 6-methylheptadiene-1,5 and polyenes such as octatriene and dicyclopentadiene. Also ethylene-α-olefin-polyene-terpolymeres can be used. Useful α-olefins include propylene, butene, pentene, isoprene, hexene or their mixtures and useful polyenes include hexadiene-1,4, hexadiene-1,5, heptadiene-1,6, 2-methylpentadiene-1,4, octadiene-1,7, 6-methylheptadiene-1,5, octatriene, dicyclopentadiene. In case that the ethylene polymer is a copolymer, the share of ethylene must be at least 50% by weight.

Propylene copolymers must consist over 50% by weight propylene and can be random- or block copolymer of propylene and ethylene or also other α-olefines can be used as comonomers, like dienes such as hexadiene-1,4, hexadiene-1,5, heptadiene-1,6, 2-methylpentadiene-1,4, octadiene-1,7, 6-methylheptadiene-1,5 and polyenes such as octatriene and dicyclopentadiene.

If polyolefine blends are used, the components are melt blended in an extruder or another type of melt blending equipment before the impregnation and polymerisation stages. Depending on the polarity of the components in the polyolefine blend the impregnation of the acrylate amount occurs mostly into the more polar component. By the selection of components having different polarities the morphology and properties of the end products vary. It is preferable to choose the melt viscosity of the components so that the component which has the highest operating temperature simultaneously also has lower melt viscosity so that it becomes the matrix in the polyolefine blend. In this way the operating temperature of the end product becomes also higher.

Suitable acrylate monomers are acrylates and methacrylates the polymers of which have low glass temperatures, i.e. they are rubberlike at the room temperature and lower temperatures, preferably at the temperature below −20° C. The glass temperature of the polyacrylate specifies the lower operating temperature of the material, below the glass temperature the polyacrylate is rigid and inelastic and the elastomeric properties of the material are lost. Suitable acrylates are alkylacrylates having one or preferably two or more carbon atoms in the alkyl chain. Methacrylates having a glass temperature low enough are alkylmethacrylates having 4 or more or preferably 8 or more carbon atoms in the alkyl chain. These monomers can be used alone or in mixtures of two or more monomers. Together with the above mentioned monomers, also smaller amounts of monomers having less carbon atoms in the carbon chain can be used. The glass temperature of the final product can thus be tailored. According to this invention one or more above described functional monomers are added to the acrylate monomer.

The end product can be tailored, if needed, according to the end application e.g. by adding oil to the acrylate or to the final polymer during the processing. Oils can be the same that are normally used to soften rubber, e.g. paraffinic, naphthenic, aromatic and synthetic oils as well as plasticisers for thermoplastics such as e.g. dioctylphthalat. The amount of added oil can typically be 0–40% by weight in the final product.

The properties of the end product like the rigidity and the operating temperature can be adjusted by the addition of conventional fillers like talc, caolin, $CaCO_3$, silica. The amount of fillers is typically 0–70% by weight in the end product.

The amount of polyacrylate and polyolefine in the end product depends on many factors, like the polyolefine type, the amount of possibly used oil and fillers and also on the usage of the end product. Typically, the ratio between polyacrylate and polyolefine is 0.5–5, preferably 0.5–2.

The crosslinking of the product can be improved by adding already to the reactor some acrylate, which has two or more double bonds. During the polymerisation these acrylates copolymerise to different acrylate chains and the polyacrylate phase is crosslinking. The suitable amount of the crosslinking agent is 0–15% by weight. Some acrylates crosslink spontaneously without any addition of diacrylate. One of these is butylacrylate.

Initiators which can be used to the polymerising of acrylate are those initiators conventionally used in the free radical polymerisation of vinyl monomers, being organic peroxides like e.g. benzoylperoxide, lauroylperoxide, t-butylperbenzoate, t-butyl-peroxy-2-ethylhexanate, t-butylperoxide, dicumylperoxide, di-t-butylperoxide, bis(t-butylperoxyisopropyl)benzene, t-butylperoxyisopropylcarbonate, 2,5-dimethyl-2,5-di-t-butylperoxyhexane, 2,5-dimethyl-2,5-di-(t-butylperoxy)hexyne-3, and azo compounds like azobisisobutyronitrile and azobisdimethylvaleronitrile.

Also more than one initiator can be used so that the polymerisation is started with an initiator having a lower half temperature and is ended with one having higher half temperature. The amount of the initiator is 0.001–2% by weight, preferably 0.1–1% by weight, based on the monomer amount.

As it was already mentioned, the elastomer according to this invention can be made by some known method in which the monomer is polymerised by the free radical method into the polyolefin matrix. The impregnation of the acrylate and the initiator can thus be made in the total absence of water, by adding some water, by adding water when more than half to he acrylate has been impregnated. These methods are in principal described in the Finnish patents FI85496, FI86642 and FI88170. The impregnation can also be made in the presence of the total amount of the suspension water as in the patent U.S. Pat. No. 4,412,938. The impregnation and polymerisation can also be made simultaneously according to the German patent publication DE 2.907.662 by keeping the water suspension of the polyolefine at an elevated temperature and by adding slowly the acrylate and the initiator.

The polyolefine and polyacrylate type and amount affect the properties of the end product and the end product can be tailored with them according to this invention. The elastomer according to the invention has especially good mechanical properties compared to responding elastomers in which no functional monomer is used among the acrylate and no functional polyolefine is used to improve the compatibility of the phases. Thus the elastomer according to the invention is especially suitable to products in which good mechanical properties are important, but is of course suitable to all applications in which conventional rubber or thermoplastic elastomers are used. As examples can be mentioned products for construction, car and electric industry and many technical products.

EXAMPLES 1–10

Polyolefine pellets and a monomer solution containing n-butylacrylate (nBA), functional monomer (FM) and a crosslinking agent (1,6-hexanedioldiacrylate, 1,6-HDDA) as well as an initiator (2,5-bis(t-butylperoxy)-2,5-dimethyl-3-hexyne) were added to the reactor. The function monomers used and their functional groups were the following:

glycidylmethacrylate (GMA), epoxy group 2-t-butylaminoethylmethacrylate (TBAEMA), secondary amin group polypropyleneglycolmonomethacrylate (PPGMMA), hydroxyl group monomethacryloyloxyethylphthalate (MMAOEP), carboxy group The reactor was rinsed with a nitrogen flow in order to remove oxygen. The reactor was closed and its temperature was raised to the impregnation temperature and the monomer solution was absorbing into the pellets. Thereafter, the suspension water, heated to the impregnation temperature, was added to the reactor as well as the suspension agents tricalsiumphosphate and sodiumdodecylbenzenesulphonate. After the water addition the temperature of the reactor was raised so much that the initiator started to decompose and start the polymerisation. The polymerisation was continued for 5.5 hours by raising the reactor temperature gradually so that the final temperature was 132° C. After the polymerisation the pellets were washed with a weak hydrochloric acid solution, after which they were dried for after treatment. The polymerisation conditions for examples 1–10 are presented in Table 1. In the table there is also presented the gel content after the polymerisation, which has been measured by extracting the specimen in boiling xylene for 20 hours. As an initiator in all polymerisations was used 2,5-bis(t-butylperoxy)-2,5-dimethyl-3-hexyne, 0.2 mole-% from the amount of polypropylene. The total amount of monomer solution charged into the reactor was 90 mol-% from the amount of polypropylene. The polypropylene used in all polymerisations was a random polypropylene (2.5 mol-% ethylene) produced by Borealis Polymers Oy, tradename ZC20 76DNA, melt index 20.

TABLE 1

Polymerisation conditions, Examples 1–10

| Ex No | Functional monomer | FM content in rubber phase, mol-% | 1,6-HDDA content, mol-% | Impreg. temperature, °C. | Polym. temperature, °C. | Monomer yield, mass-% | Gel content after polym, mass-% |
|---|---|---|---|---|---|---|---|
| 1 | — | — | 0,07 | 112 | 118–132 | 94 | 52 |
| 2 | GMA | 2 | — | 116 | 124–132 | 95 | 49 |
| 3 | GMA | 5 | — | 116 | 124–132 | 95 | 50 |
| 4 | TBAEMA | 2 | 0,07 | 114 | 122–132 | 94 | 42 |
| 5 | TBAEMA | 5 | 0,07 | 115 | 125–132 | 92 | 36 |
| 6 | PPGMMA | 2 | 0,07 | 116 | 126–132 | 96 | 44 |
| 7 | PPGMMA | 5 | 0,07 | 121 | 124–132 | 91 | 43 |
| 8 | ROMM | 2 | 0,07 | 119 | 125–132 | 89 | 46 |
| 9 | MMAOEP | 2 | 0,07 | 119 | 124–132 | 96 | 51 |
| 10 | MMAOEP | 5 | 0,07 | 123 | 124–132 | 92 | 53 |

The materials added during the melt processing after the polymerisation are given in Table 2. During the melt processing, bonds between the phases could be achieved by means of the reactions between the functional groups, which improved the mechanical properties of the blends. The amount functionalised polypropylene added was 5 mol-% of the total amount of the blend, PP-g-AA means a polypropylene grafted with acrylic acid, in which the amount of acrylic acid is 6.04 mol-%, PP-g-MAH means a polypropylene grafted with maleic acid anhydride, in which the amount of grafted maleic acid anhydride is 0.4 mol-%. The melt blending was made in a twin-screw extruder in which the die temperature was 180° C., processing time 2 min and speed 50 rpm.

TABLE 2

Functionalised polypropylene and zinc acetate added during the ment blending

| Ex. no | Functional monomer (FM) | Functionalised polypropylene | Zinc acetate amount, mol-% |
|---|---|---|---|
| 1 | — | — | — |
| 2 | GMA | PP-g-AA | — |
| 3 | GMA | PP-g-AA | — |
| 4 | TBAEMA | PP-g-MAH | — |
| 5 | TBAEMA | PP-g-MAH | — |
| 6 | PPGMMA | PP-g-AA | — |
| 7 | PPGMMA | PP-g-AA | — |
| 8 | ROMM | PP-g-AA | — |
| 9 | MMAOEB | PP-g-AA | 0,7 |
| 10 | MMAOEB | PP-g-AA | 0,7 |

Zinc acetate is added in the examples 9 and 10, because the both functional monogroups are acid groups. The $Zn^{2+}$-group of zinc acetate coordinates during the melt processing between the carboxylic group of the PP-g-AA in the polyolefine phase and the carboxylic group of the MMAOEP in the rubber phase, when acetic acid is liberated and a zink bridge (R—COO—$ZN^{2+}$—OOC—R) is formed between the phases.

After the melt processing the material was pelletised and dried. After that the materials were injection moulded at 180° C., the die temperature being 30° C. From the material, it was made sheets (2×80×80 mm), from which specimen for mechanical tests were punched. The mechanical and thermal properties of the blends are given in Table 3.

The mechanical properties were improved, compared with the comparative material (example 1), for all modified blends. The best results were obtained with the blends 3 and 4,—in which the amounts of the modification agents in the rubber phase were: glycidyl methacrylate (GMA) 5 mol-% and 2-t-butylaminoethylmethacrylate (TMAEMA) 2 mol-%. The properties of the blend 4, modified with maleic anhydride grafted polypropylene (PP-g-MAH) and TMAEMA were improved in average (mediate of the mould direction and the transverse direction); elastic modulus 30%, tensile, strength 13%, elongation 82% and tear strength (flow direction) 47%. From these results it can be seen that the compatibilised blends to which it was in the polymerisation stage added functional comonomer and in the melt processing stage functionalised polyolefin are clearly better compared to non-compatibilised blends.

Tensile strength, elongation at break and elastic modulus are made by the standard method ISO 37, tear strength by the method ISO 34 (trouser test) and hardness by method ISO 868. Glass transition temperatures are measured by DMTA, heating speed 5°/min, three point bending method, 1 Hz.

TABLE 3

The mechanical and thermal properties of the blends. Properties are given in the table both in flow direction and in the transverse direction (MD/TD)

| Ex No | Tensile strength MPa | Elongation at break % | Elastic modulus MPa | Tear strength kN/m | Hardness Shore D | $T_g$ rubber phase °C. | $T_g$ matrix °C. |
|---|---|---|---|---|---|---|---|
| 1 | 10,7/8,9 | 160/90 | 250/230 | 35 | 38 | −45,3 | −2,0 |
| 2 | 12,3/10,4 | 80/70 | 305/330 | 52 | 40 | −43,5 | −2,7 |
| 3 | 12,2/10,5 | 205/100 | 330/305 | 47 | 40 | −41,6 | −2,0 |
| 4 | 12,1/10.0 | 180/235 | 340/275 | 52 | 40 | −44,0 | −1,9 |
| 5 | 11,8/10,1 | 205/225 | 325/290 | 40 | 40 | −41,7 | −1,2 |
| 6 | 11,3/9,6 | 200/170 | 290/265 | 38 | 39 | −47,9 | −2,3 |
| 7 | 11,9/9,9 | 200/110 | 320/300 | 36 | 40 | −48,4 | −2,7 |
| 8 | 12,6/10,8 | 120/255 | 355/345 | 38 | 42 | −48,3 | −2,9 |
| 9 | 11,8/10,3 | 140/220 | 300/275 | 36 | 41 | −44,8 | −4,9 |
| 10 | 12,2/10,3 | 165/175 | 255/225 | 32 | 40 | −42,3 | −2,5 |

EXAMPLES 11–22

In these examples, polyolefin blend was used instead of single polyolefin. Polyolefin components were blended in a corotating twin-screw extruder of type Werner & Pfleiderer (D=25 mm, L/D=39) using melt temperature 190° C., residence time on an average 2 min and a screw speed 200 rpm. The extrudate was cooled in a water bath and was pelletised to 3 mm pellets. Thereafter the pellets were dried at 70° C. for 5 hours before the impregnation stage. The structure of the above mentioned blend has been photographed by an transmission electron microscope and it has been seen that the dispersed phase is a copolymer of ethylene and butylacrylate (EBA) and the continuous phase is a copolymer of propylene and ethylene. The diameter of the particles is about 0.5–$\mu$m.

Polyolefine pellets containing polyolefine blend, acrylate, initiator and possible 1,6-hexanedioldiacrylate were added to the reactor. The reactor was filled and emptied three times with 7–8 bar nitrogen in order to remove oxygen from the reactor. After that the temperature was raised to the impregnation temperature and kept there, stirring continuously, until the major part of the acrylate and the initiators were impregnated. The impregnation time was 1–3 hours depending on the polyolefine quality. Thereafter, the suspension water, also rinsed with nitrogen, was added. The suspension water contained tricalsiumphosphate and sodiumdodecylbenzenesulphonate as a suspension agent. The temperature of the suspension water was the same as the impregnation temperature. After the water addition the temperature was raised so much that the initiator started to decompose and initiate the polymerisation. The polymerisation took 7–12 hours depending on the components in the polyolefine blend. The polymerisation product was washed and dried after the polymerisation. Several different materials were made according to this model, see Table 1, examples 1–12. The structure has been photographed by a transmission electron microscope. The dark dispersed phase is EBA and the dispersed phase in EBA is polybutylacrylate. The continuous phase is a copolymer of propylene and ethylene. The diameter of the polyacrylate particles is about 0.1 $\mu$m.

The polymer materials made according to Table 4 were injection moulded to sheets having the size of 80×80 mm and the thickness of 2 mm, at 200° C. The necessary test bars were punched from the sheets. The mechanical properties are in Table 5. Elongation at break and tensile strength have been measured from test rods which are punched transverse to the flow direction of the injection moulding.

All need polyolefine qualities are commercial products of Borealis Polymers Oy:

EBA1=NCPE 6417, ethylene/butylacrylate copolymer (17% butylacrylate, melt index 7)

EBA2=NCPE 6420, ethylene/butylacrylate copolymer (17% butylacrylate, melt index 1,5)

EBA3=NCPE 6427, ethylene/butylacrylate copolymer (27% butylacrylate, melt index 4)

PP1=XC20 76DNA, polypropylene (random copolymer, melt index 20)

PP2=VC50 76DNA, polypropylene (homopolypropylene, melt index 50)

TABLE 4

Polymerisation conditions of the blends, Examples 11–22.

| Ex. Nr | PO-blend | PO blend w-% | blend w-% | Acrylate w-% | Diacrylate[3] w-% | Initiator type[2] | Impreg. ° C. | Polym. ° C. | Gel[1] % |
|---|---|---|---|---|---|---|---|---|---|
| 11 | EBA1/PP1 | 30/70 | 30 | 70 | 1,5 | BPIC | 84 | 85–115 | 75 |
| 12 | EBA2/PP1 | 50/50 | 60 | 40 | 0,3 | BPIC | 67 | 85–115 | 51 |
| 13 | EBA2/PP1 | 50/50 | 50 | 50 | 0,3 | BPIC | 84 | 85–115 | 63 |
| 14 | EBA2/PP1 | 50/50 | 45 | 55 | 0,3 | BPIC | 88 | 90–115 | 59 |
| 15 | EBA2/PP1 | 50/50 | 50 | 50 | 0,3 | BPIC | 87 | 90–120 | 55 |
| 16 | EBA2/PP1 | 60/40 | 50 | 50 | 0,3 | BPIC | 86 | 88–120 | 56 |
| 17 | EBA2/PP2 | 70/30 | 60 | 40 | 0,3 | t-BPB | 78 | 80–130 | 51 |
| 18 | EBA2/PP2 | 65/35 | 60 | 40 | 0,3 | BPIC | 78 | 85–120 | 56 |
| 19 | EBA3/PP1 | 60/40 | 60 | 40 | 0,3 | BPIC | 58 | 70–120 | 45 |
| 20 | EBA3/PP1 | 60/40 | 60 | 40 | 0,3 | BPO | 56 | 60–100 | 54 |
| 21 | EBA3/PP1 | 55/45 | 60 | 40 | 0,3 | BPO | 56 | 60–100 | 51 |
| 22 | EBA2/PP2 | 70/30 | 60 | 40 | 0,3 | BPIC | 77 | 80–120 | 47 |

1) Gel contend measured in boiling xylene during 16 hours.
2) BPO = benzoylperoxide, BPIC = tert-butylperoxyisopropylcarbonate, t-BPB = tert-butylperoxybenzoate
3) Diacrylate = 1,6-hexanedioldiacrylate

TABLE 5

Mechanical properties of the materials in the examples 11–22.

| Exp Nr | Tension strength[2] MPa, MD/TD | Elongation at break[1] %, MD/TD | IRHD[3] normal | Compression set[4] % | Tear strength[5] kN/m MD/TD |
|---|---|---|---|---|---|
| 11 | 5,8/4,9 | 45/80 | 86 | 25 | 4/5 |
| 12 | 10,5/9,7 | 180/300 | 96 | 25 | 19/27 |
| 13 | 8,6/6,8 | 100/210 | 93 | 37 | 20/21 |
| 14 | 8,5/7,0 | 120/210 | 90 | — | 11/14 |
| 15 | 8,0/7,0 | 110/240 | 93 | 25 | 13/19 |
| 16 | 9,0/8,5 | 100/220 | 89 | 30 | 14/14 |
| 17 | 9,0/8,0 | 140/220 | 92 | 31 | 15/19 |
| 18 | 9,0/7,0 | 110/260 | 94 | — | 13/20 |
| 19 | 9,0/8,0 | 110/190 | 92 | — | 11/14 |
| 20 | 9,0/9,0 | 110/260 | 92 | 36 | 15/19 |
| 21 | 9,0/8,0 | 130/300 | 93 | 38 | 15/22 |
| 22 | 9,0/8,0 | 110/220 | 93 | 29 | 12/19 |

1) Elongation at break measured by ISO 37
2) Tensile strength measured by ISO 37
3) Hardness, IRHD, measured by ISO 48
4) Compression set after 24 hours at room temperature by ISO 815
5) Tear strength measured by ISO 34
MD = measured in the flow direction of the material in injection moulding
TD = measured against the flow direction in the injection moulding The amount of polyacrylate has the biggest effect to the hardness of the product, the higher amount of polyacrylate the softer product, compare examples 12, 13 and 14.

EXAMPLES 23–25

In table 6 is presented the polymerisation conditions for the blends of examples 23–25. There example 23 only contains a polyolefine blend and polyacrylate while the blend of example 24 contain 10% of weight naphthenic oil, Nypar 840. The blend in example 25 contains additionally 20% of weight calcium carbonate.

TABLE 6

Polymerisation conditions of blends, Examples 23–25.

| Ex. Nr | PO-blend | PO blend w-% | blend w-% | Impreg. °C. | Polym. °C. | Filler w-% CaCO$_3$ | Oil content w-% Nytex 840 |
|---|---|---|---|---|---|---|---|
| 23 | EBA2/PP1 | 50/50 | 50 | 85 | 85–120 | — | — |
| 24 | EBA2/PP1 | 50/50 | 50 | 85 | 85–120 | — | 10 |
| 25 | EBA2/PP1 | 50/50 | 50 | 85 | 85–120 | 20 | 10 |

Diacrylate=1,6-hexanedioldiacrylate, 0.3% by weight, in all examples 13–15 Initiator BPIC The mechanical properties of examples 23–25 are given in Table 7. The oil and calcium carbonate addition decreased the tensile strength, but the elongation at break increases. Also the material becomes softer, from 93 to 88 IRHD normal by oil and filler addition. The compression set becomes about 20% as a result of the oil addition.

TABLE 7

Mechanical properties of the materials of examples 23–25

| Exp Nr | Tensile strength$^2$ MPa, MD/TD | Elongation at break$^1$ %, MD/TD | IRHD$^3$ normal | Compression set$^4$ % |
|---|---|---|---|---|
| 23 | 9,0/9,0 | 140/290 | 93 | 35 |
| 24 | 7,0/7,0 | 160/160 | 89 | 89 |
| 25 | 6,0/6,0 | 170/300 | 88 | 28 |

1) Elongation at break measured by ISO 37
2) Tensile strength measured by ISO 37
3) Hardness, IRHD, measured by ISO 48
4) Compression set after 24 hours at room temperature by ISO 815
MD = measured in the flow direction of the material in injection moulding
TD = measured against the flow direction in the injection moulding A comparison between an purely PP-based material (=REF) and PP/EBA-blend based material (example 13) has been made in table 8. The reference material contains only PP1 (see table 4) as a polyolefine while the polyolefine in the material in example 13 is a blend of PP1 and EBA2. The hardness of both materials is about the same (91 and respectively 93 IRHD normal), which makes it possible to directly compare the materials. The tear strength in the polyolefine blend (PP/EBA) based material is about 10 times better than the tear strength of the reference material. A clear increase can also be seen in the tensile strength.

TABLE 8

Comparison between purely PP-based (REF) and PP/EBA-based TPE (example 13)

|  | REF | Example 13 |
|---|---|---|
| Polyolefine blend, PP, w-% | PP1, 100% | PP1, 50% |
| Polyolefine blend, EBA, w-% | — | EBA2, 50% |
| Polyolefine (blend or PP) | 33% (PP1) | 50% PP1 + EBA2 |
| Acrylate, w-% | 67% | 50% |
| Diacrylate (1,6 hexanedioldiacrylate), w-% | 3% | 0,3% |
| Initiator type | Trig. 145 | BPIC |
| Impregnation temperature | 120° C. | 84° C. |
| Polymerisation temperature | 130–150° C. | 85–115° C. |

TABLE 8-continued

Comparison between purely PP-based (REF) and PP/EBA-based TPE (example 13)

|  | REF | Example 13 |
|---|---|---|
| Gel | 63% | 63% |
| Tension strength, MPa, MD/TD | 6,9/6,6 | 8,6/6,8 |
| Elongation at break, %, MD/TD | 45/56 | 100/210 |
| IRHD normal | 91 | 93 |
| Tear strength, kN/m, MD/TD | 2,8/3,4 | 19,8/20,5 |

We claim:

1. A thermoplastic elastomer produced by the process which comprises:

a) combining polyolefin particles, at least one acrylate monomer and a free radical polymerization initiator, wherein said at least one acrylate monomer includes a functional acrylate monomer; and b) heating the resultant mixture to cause said acrylate to polymerise and impregnate into said polyolefin particles and to cause crosslinking of said acrylate to produce a polyolefin-polyacrylate blend, wherein crosslinked polyacrylate comprises a dispersed phase in a continuous phase of said polyolefin.

2. A thermoplastic elastomer according to claim 1, wherein a functional polyolefin is combined with said polyolefin particle, said at least one acrylate monomer and said initiator.

3. A thermoplastic elastomer according to claim 1, wherein a functional polyolefin is blended with said polyolefin-polyacrylate blend after said polymerisation.

4. A thermoplastic elastomer, according to any one of claims 1–3, wherein said polyolefin particles comprise a blend of two or more polyolefines which have been melt blended.

5. A thermoplastic elastomer, according to any one of claims 1–3, wherein said functional acrylate monomer is carboxylic acid, oxazoline, epoxy-, amino- or hydroxyfunctional (meth)acrylate.

6. A thermoplastic elastomer, according to any one of claims 1–3, wherein the amount of the functional acrylate monomer is 0.1–15% by weight based on the amount of the acrylate monomer.

7. A thermoplastic elastomer, according to claim 2 or 3, wherein said functional polyolefine is carboxylic acid or anhydride or some other carboxylic acid derivative.

8. A thermoplastic elastomer, according to claim 5, wherein the amount of the functional polyolefine in the elastomer is 0.1–15% by weight.

9. A thermoplastic elastomer, according to claim 1, wherein the polyacrylate can be crosslinked by copolymerising the acrylate with a diacrylate or a multifunctional acrylate during the polymerisation or the acrylate crossslinks spontaneously.

10. A thermoplastic elastomer, according to claim 1, wherein the polyacrylate has a glass transition temperature lower than room temperature.

11. A thermoplastic elastomer, according to claim 1, wherein the monomers for the polyacrylate are alkyacrylates with 2 or more carbon atoms in the alkyl chain, alkymethacrylates with 4 or more or preferably with 8 or more carbon atoms in the alkyl chain, alkylacrylates and methacrylates which contain polar groups.

12. A thermoplastic elastomer, according to claim 1, wherein the polyolefine is polypropylene, polypropylene containing comonomers, polyethylene or polyethylene containing comonomers or a blend of them.

13. A thermoplastic elastomer, according to claim 1, wherein the weight proportion between the polyolefine and the polyacrylate in the blend is 0.1–5.

14. A thermoplastic elastomer, according to claim 1, wherein up to 40% by weight oil is added into the polymerisation or during a separate extrusion stage in order to make the material softer.

15. A thermoplastic elastomer, according to claim 1, wherein the end product contains up to 70% by weight fillers.

16. A thermoplastic elastomer, according to claim 1, wherein the elastomer is processed by conventional processing methods like extrusion, injection moulding, blow moulding and coextrusion with polyolefines.

17. A thermoplastic elastomer, according to claim 1, wherein it has good oil and weather resistance properties.

* * * * *